United States Patent [19]

Beck

[11] Patent Number: 4,982,549

[45] Date of Patent: Jan. 8, 1991

[54] METHOD FOR END TO END COUPLING PREFABRICATED ELEMENTS OF REINFORCED CONCRETE

[75] Inventor: René-André Beck, Pully, Switzerland

[73] Assignee: BSA Ingenieurs Conseils, Pully, Switzerland

[21] Appl. No.: 401,639

[22] Filed: Aug. 31, 1989

[30] Foreign Application Priority Data

Oct. 7, 1988 [CH] Switzerland .................. 3740/88

[51] Int. Cl.⁵ ............................................... E04C 3/30
[52] U.S. Cl. ...................................... 52/726; 52/722; 405/252
[58] Field of Search ................... 52/726, 259, 722; 405/153, 251, 252

[56] References Cited

U.S. PATENT DOCUMENTS 2,724,261 11/1955 Rensaa .
4,081,935 4/1978 Wise ........................................ 52/726

FOREIGN PATENT DOCUMENTS 358960 3/1906 France .
2197095 3/1974 France .
484293 12/1975 U.S.S.R. ................................. 52/726
452520 8/1936 United Kingdom .
869696 6/1961 United Kingdom .

OTHER PUBLICATIONS

Journal Prestressed Concrete Institute, "Splicing of Precast Prestressed Concrete Piles", Bruce, Jr., 1974, p. 7 & Fig. 3.

Primary Examiner—David A. Scherbel
Assistant Examiner—Creighton Smith
Attorney, Agent, or Firm—Young & Thompson

[57] ABSTRACT

A method for end to end coupling prefabricated elements of reinforced concrete, for example so as to realize a column or pillar. The elements (A, B) have cavities (5) in their ends and are placed in alignment with their respective ends comprising the cavities the one against the other, the relative angular position of the elements being such that the reinforcement metallic rods (2a) projecting beyond the end of one of the elements are introduced into the cavities of another adjacent element, and reciprocally, and that the end of the rods (2a, 2b) are introduced with clearance in positioning sleeves (6) having an opening (6′) usable for welding. Then the metallic rods put end to end are welded together, and the cavities are filled in with concrete or with another appropriate material.

3 Claims, 2 Drawing Sheets

METHOD FOR END TO END COUPLING PREFABRICATED ELEMENTS OF REINFORCED CONCRETE

The present invention relates to a method for end to end compling prefabricated elements of reinforced concrete, as well as to a column of reinforced concrete obtained by this method.

For assembling end to end prefabricated elements of reinforced concrete, for example in order to manufacture masts or columns, several techniques are known and actually used, amoung which one can mention:

the welding of frames by recovering: this technique necessitates an important space between the ends of the elements to assembly, said space which should be then filled in by pouring a large volume of concrete, this making the operation impossible on the building site; the use of male and female cones which fit together; this technique is expensive and especially leads to a weakening of the section due to the smaller diameter of the cone;

the fastening by means of metallic straps bound to the reinforcement; this technique is also expensive, relatively difficult to realize and reduces the effective section.

The purpose of this invention consequently consists in obviating to the drawbacks of the precited known techniques; this purpose is achieved by the method according to the invention, which is characterized in that each element comprises at at least one of its ends cavities formed in its periphery, these cavities being opened on the lateral face as well as on the frontal face of said element, and that longitudinal metallic rods of the reinforcement emerge into said cavities, whose free end terminates short of the end of the element, other rods of the reinforcement which are located between said cavities projecting beyond the end of the element, in that the elements are placed in alignment with their respective ends comprising the cavities the one against the other, the relative angular position of said elements being such that the reinforcement metallic rods projecting beyound the end of one of the elements are introduced into the cavities of another adjacent element, and reciprocally, and that the end of the rods are introduced with clearance in positioning sleeves having an opening usable for welding, then that the metallic rods thus put end to end are welded together, and that said cavities are filled in with concrete or with another appropriate material.

A further object of this invention consists in a column of reinforced concrete as obtained by the above method according the invention.

The annexed drawings illustrate the invention schematically and by way of example.

The annexed drawings (FIGS. 1 to 3) represent, by way of example, the ends of two cylindrical columns elements A,B made of centrifugated or vibrated concrete. Main and secondary longitudinal metallic reinforcements $2a, 2b$ respectively 3 are embedded during manufacture in the wall 1 of each column element A,B as well as wire hoops wire 4 disposed around said reinforcements $2a, 2b, 3$.

During the manufacture of the wall 1 by centrifugation or vibration of concrete, shaped elements, for example of "Sagex", are disposed in the mold, in such a manner as to form in said wall 1 cavities 5 opened at the periphery on the frontal face as well as on the lateral face of the wall 1. The cavities 5 are disposed so as to correspond to the position of the end of certain metallic rods $2a$ of the main reinforcement, more particularly of one rod of two, that is in an alternative manner with a rod $2b$ completely embedded in the concrete (see FIG. 2).

Figure 1:
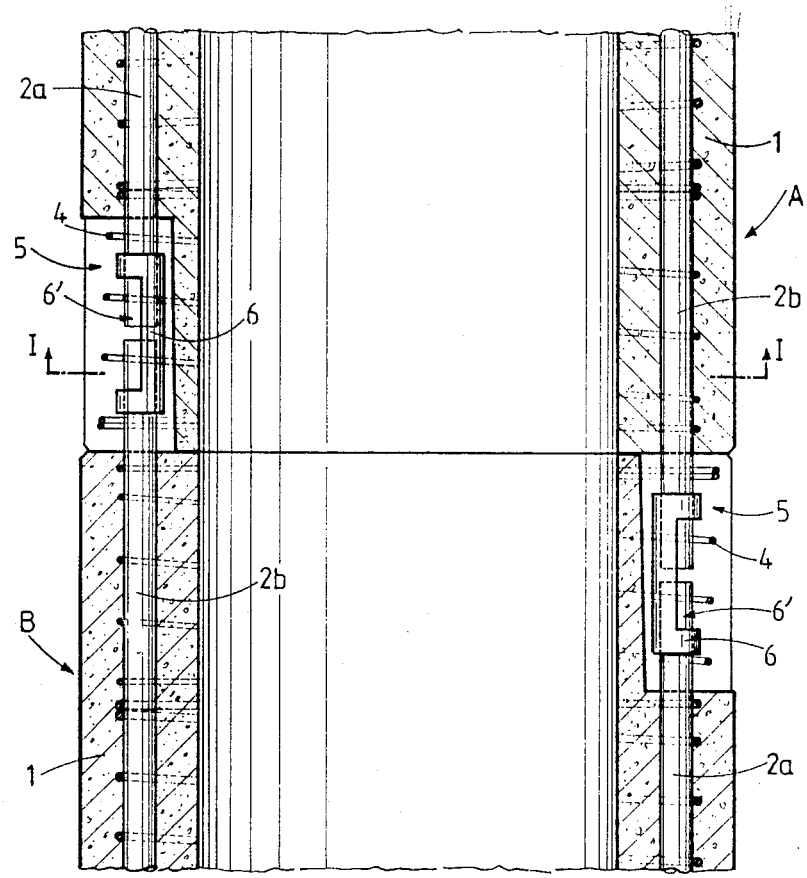
FIG. 1 is a longitudinal section view of the end of two elements of reinforced concrete in pre-coupled end to end positions.
Figure 2:
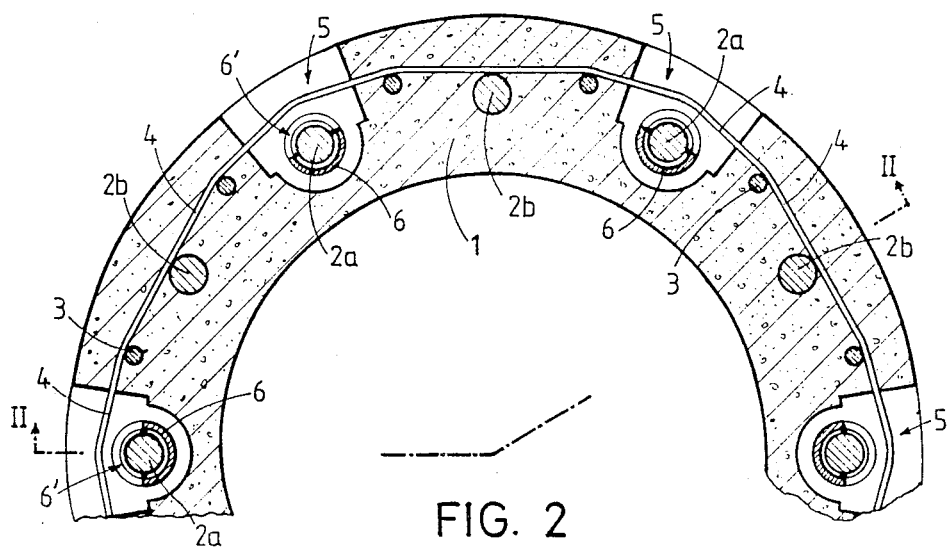
FIG. 2 is a cross-sectional view along line I—I of FIG. 1.

Furthermore, as shown in FIG. 1, the rods $2a$ which emerge in the cavities 5 are cut so as to end short of the end of the wall 1, whereas the rods $2b$ which are completely embedded in the concrete wall 1 are maintained at their initial length, thereby to project at the frontal end of said wall 1.

For the end to end assembly of two column elements A,B, they have to be placed horizontally or vertically in alignment, and by taking care to angularly orient them so as the portions of metallic rods $2b$ projecting frontally from one of the columns elements enter the cavities 5 of the other column element, and reciprocally, to permit fastening one to the other by welding. Before placing both columns elements A,B, end to end, the frontal face of the walls 1 may be provided with a gluing material, for example a mortar.

In order to facilite and to make the welding step more efficient, a metallic sleeve 6 is preferably used, in which the ends of the rods $2a, 2b$ to be welded are introduced with clearance, and which presents an opening $6'$ to allow the access of the welding device to the ends to be welded.

Figure 3:
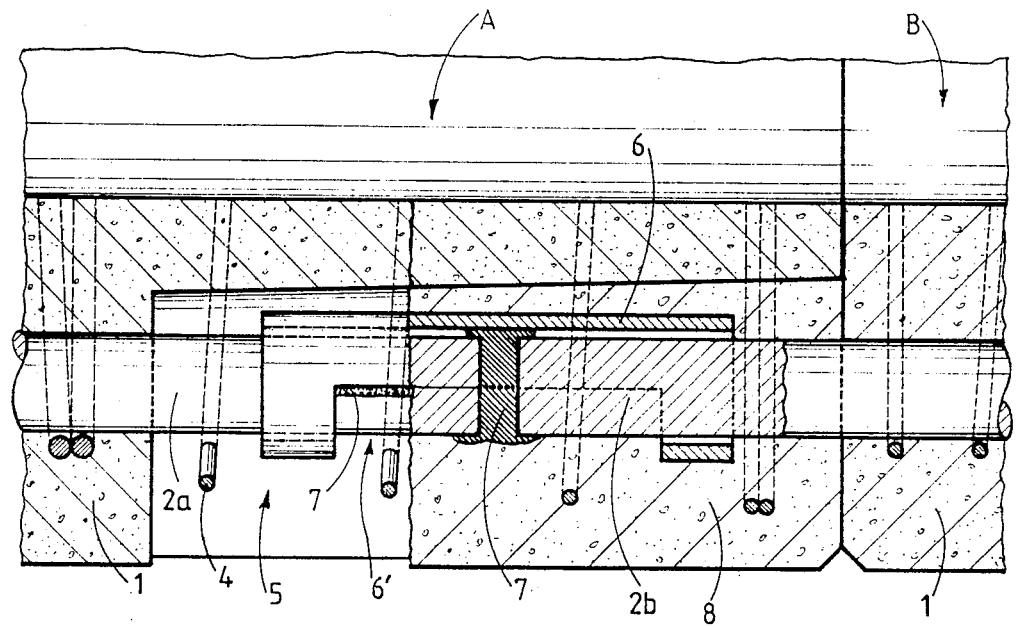
FIG. 3 is an enlarged view of a detail of FIG. 1, in a completely coupled position.

As illustrated in FIG. 3, the welding material 7 allows fastening the rods $2a, 2b$ end to end and in the sleeve 6; then, the cavities are filled in by pouring of concrete 8, so as to protect from corrosion the joint thus formed and particularly to permit a finishing operation of the external surface of the column or mast thus realized, in order that this joint is practically invisible from outside. Of course it is possible to use as filling and finishing material a material other than concrete, for example a synthetic resin.

One of the advantages of the method according to this invention consists in that, due to the fact that the binding zone undergoes an important heating, the metallic rods of the reinforcement are first elongated, then shrink during the cooling; this leads to a prestress which improves the quality of the coupling. In order to facilitate this phenomenon, the portions of the rods $2a, 2b$ located in the concrete before emerging in the cavities, respectively before projecting frontally from the wall 1, that is the portions which will be subjected to an important heating, are previously coated with a layer of protecting varnish intended to favor the elongation and shrinking "sliding notion" of the metal in the concrete. The varnish used can be for example a Zn point, of the type "Galvazinc".

The method according to the invention is relatively easy to carry out and is less expensive than the known methods. Furthermore, it can be carried out in the factory as well as directly on the building site, and leads to a reliable result without any loosening of the section and with an optimal use thereof.

In case of an assembly in the factory, for example for the realization of a pillar, the column elements to be coupled will be preferably disposed horizontally, and a fixing rod will be used which is axially disposed inside the column elements to be assembled end to end, and tightened at its both ends against the free ends of said column elements.

In case of an assembly on the building site, the method will be preferably carried out in vertical position, the upper column element being placed and maintained on the lower column element by means for example of a crane.

Figure 4:
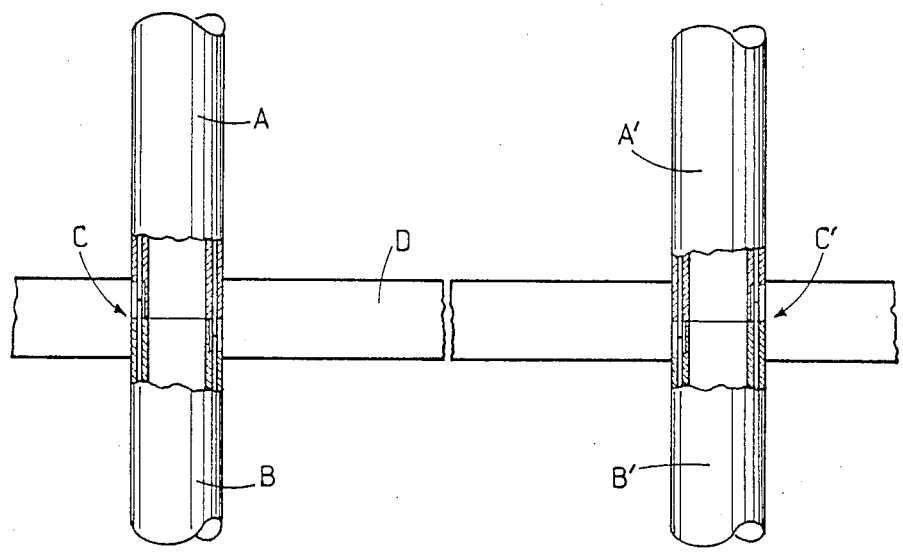
FIG. 4 is a cross-sectional view of a particular application of the elements as columns for the structure of a building.

Finally, according to a particular application of the invention, schematically shown in FIG. 4, one can advantageously use the coupling method according to the invention for realizing columns A,B and A'B' intended to be used in the bearing structure of a building. In that case, the building C,C' between both parts of each column is completely embedded in the horizontal slab D, this enabling obtaining a decrease of the buckling length of said columns.

I claim:

1. Method for end to end coupling prefabricated elements of reinforced concrete, each element (A, B) comprising at at least one of its ends cavities (5) in its periphery, these cavities being opened on an outer lateral face as well as on an end face of said element, longitudinal metallic rods (2a) of the reinforcement emerging into said cavities, said rods having free ends that terminate short of said end face, other rods (2b) of the reinforcement which are located between said cavities projecting beyond said end face of the element, the method comprising placing the elements in alignment with their respective ends containing the cavities against each other, the relative angular position of said elements being such that the reinforcement metallic rods (2b) projecting beyond the end of one of the elements are introduced into the cavities (5) of another adjacent element, and vice versa, introducing the ends of the rods into positioning sleeves (6) having an opening (6') usable for welding, then welding together the metallic rods thus put end to end, and filling said cavities with a filling and finishing material.

2. Method according to claim 1, wherein the filling of the cavities is carried out simultaneously with the pouring of a concrete slab (D) at the level of the coupling of the prefabricated elements intended to bear said slab.

3. Prefabricated pillar of reinforced concrete obtained by the method according to claim 1.

* * * * *